United States Patent
Cihlar et al.

(10) Patent No.: US 6,471,614 B1
(45) Date of Patent: Oct. 29, 2002

(54) GEAR DRIVE, ESPECIALLY PLANETARY GEAR DRIVE, WITH PRESSURE EQUALIZATION

(75) Inventors: Bernd Cihlar, Freiburg (DE); Berthold Bühler, Lahr (DE)

(73) Assignee: Neugart GmbH & Co., Kippenheim (DE)

(*) Notice: Subject to any disclaimer, the term of this patent is extended or adjusted under 35 U.S.C. 154(b) by 0 days.

(21) Appl. No.: 09/589,605

(22) Filed: Jun. 7, 2000

(30) Foreign Application Priority Data

Aug. 25, 1999 (DE) .......................... 199 40 235

(51) Int. Cl.⁷ ............................................. F16H 57/04
(52) U.S. Cl. ....................................................... 475/159
(58) Field of Search .................. 475/159; 277/634, 277/926, 927

(56) References Cited

U.S. PATENT DOCUMENTS

| | | | |
|---|---|---|---|
| 4,037,883 A | * 7/1977 | Fuchs | 303/116 |
| 4,624,465 A | * 11/1986 | Rogemont | 277/34 |
| 5,117,956 A | * 6/1992 | Tsujita | 475/249 |
| 5,125,291 A | 6/1992 | Makita et al. | 74/730.1 |
| 5,131,498 A | * 7/1992 | Kato et al. | 475/249 |
| 5,363,930 A | * 11/1994 | Hern | 384/93 |
| 5,434,748 A | * 7/1995 | Fukui et al. | 277/207 R X |
| 5,520,257 A | * 5/1996 | Crews | 277/92 X |

FOREIGN PATENT DOCUMENTS

| | | |
|---|---|---|
| DE | 3439225 | 8/1986 |
| DE | 4018601 | 12/1990 |
| DE | 19940235.3 | 12/1999 |

OTHER PUBLICATIONS

Translation Of Pertinent Portion Of Dec. 21, 1999 Examination Report For German Application 199 40 235.3–12.

\* cited by examiner

*Primary Examiner*—Charles A Marmor
*Assistant Examiner*—Roger Pang
(74) *Attorney, Agent, or Firm*—Volpe & Koenig, P.C.

(57) ABSTRACT

Gear drive (1), for example, a planetary gear drive, having a housing (2) and at least one shaft (4), for example, an output shaft leading through the housing wall (3) toward the outside. For equalization of pressure, a pressure-equalization chamber (5) is positioned in the interior of the shaft (4) and/or a drive part (6) associated therewith and is connected, on the one hand, with the interior of gear drive (1) and, on the other hand, with the external atmosphere, for example, via a borehole (11) running through shaft (4) so that the shaft (4), which has to pass through the housing (2) of the gear drive (1), is employed in equalization of pressure. Located in the pressure-equalization chamber (5) is a membrane (7) that is deformable via pressure differentials. The membrane separates and seals the external atmosphere and the interior of the gear drive from each other.

12 Claims, 2 Drawing Sheets

GEAR DRIVE, ESPECIALLY PLANETARY GEAR DRIVE, WITH PRESSURE EQUALIZATION

BACKGROUND

The present invention concerns a gear drive, especially a planetary gear drive, with a housing and with at least one shaft passing through a housing wall, especially an input and/or an output shaft, a pressure-equalization chamber being provided between the interior of the drive housing and the external atmosphere for equalization of pressure.

Known, for example, from DE 40 18 601 A1 is equalizing the pressure in a gear drive of the type mentioned above with the aid of a disk-shaped membrane secured via the mounting edge in a ventilation opening or pressure-equalization chamber in the housing wall of the drive, the two deformation endpoints of the membrane defining an approximately lens-shaped space.

Known from DE 34 39 225 C2 is a gear drive again with pressure equalization in the housing wall, a membrane-like hollow body shaped approximately like a bellows being positioned in a ventilation opening of the housing wall.

In all of these cases, the housing wall must have sufficient room as regards both the surface area expanse of the corresponding point in the housing wall as well as its thickness.

However, due, for example, to housing designs relating to certain installation conditions or for structural reasons, incorporating such a ventilation opening or damping chamber of sufficient size in a housing wall of the gear drive may not be possible or in many cases only insufficiently so.

Know from DE-GM 1 933 920 is a gear drive of another type, in which ventilation occurs via an output shaft with a longitudinal borehole leading to the outside and a cross borehole leading to the interior of the drive. A pressure-equalization chamber is not provided here so that an exchange of oil vapors or similar impurities can occur between the interior of the gear drive and the external atmosphere during operation.

The problem therefore exists of providing a gear drive of the type mentioned above in which pressure equalization between the interior of the drive housing and the external atmosphere is possible without providing an appropriate pressure-equalization chamber of the size necessary for the pressure equalization in the housing wall.

SUMMARY

The solution to the apparently contradictory problem includes providing the ventilation opening or pressure-equalization chamber positioned in at least one of the shafts passing through the drive housing and/or in related drive parts—in the case of only one exiting shaft, in that shaft—and is connected, on the one hand, with the interior of the gear drive and, on the other hand, with the external atmosphere. The solution further includes providing a membrane deformable by pressure differences positioned and mounted in the pressure-equalization chamber.

The invention thus makes use of the fact that in a gear drive as defined above, a shaft passes through the housing wall. The invention then utilizes this shaft in producing pressure equalization between the interior of the housing and the external atmosphere so that corresponding ventilation openings or pressure-compensation chambers can be avoided in the housing wall. If necessary, however, pressure equalization can also be attained through combination of a housing-wall pressure-equalization chamber possibly not sufficiently large all by itself and a further chamber in the shaft and/or a related drive part.

Effective pressure equalization between the interior of the gear drive and the external atmosphere with simultaneous prevention of leakage of lubricant or entrance of impurities can be attained through the fact that the membrane positioned in the pressure-equalization chamber in the interior of the shaft and/or drive part connected directly or as one piece with the shaft is essentially pot- or cap-shaped and exhibits, starting from the circular mounting edge, a circular side wall as well as a bottom wall connected to the side wall at the end opposite the mounting edge. The membrane with the bottom wall can be moved with respect to the mounting edge by turning it inside out. The membrane represents a tight seal between the external atmosphere and the interior of the gear drive so that no dirt can get into the drive from the outside and no lubricants can pass from the interior of the gear drive to the outside. Nevertheless, effective pressure equalization can be attained. Here, the invention makes use of the fact that especially output drive shafts frequently have a large diameter appropriate for transmitting high torques and radial loads and permitting the positioning of a corresponding pressure-equalization chamber in their interior without adversely affecting the actual functioning of the shaft.

With respect to positioning in the interior of a drive shaft and/or a drive part associated therewith, it is useful if the pressure-equalization chamber and the membrane as well as the side wall have an essentially circular cross-section and are particularly positioned concentrically in the interior of the shaft. At the same time, out-of-balance problems are avoided due to the concentric arrangement and the resulting uniform weight distribution.

The bottom wall of the membrane can run approximately parallel to the plane of the mounted edge and can itself be flat or curved. The circular side wall can be of an essentially constant size over the entire axial range. Thus, depending on the size of the pressure differential to be equalized, the bottom wall can be moved back and forth with respect to the mounting edge by turning the side wall partially or entirely inside out.

Here, the inner diameter of the cap-shaped or hat-shaped membrane in the area of the mounting edge can be about the same, possibly smaller, or especially somewhat larger than the axial range of the nondeformed membrane. Especially a membrane in which the axial length of the side wall is less than the diameter can be readily turned inside out. However, this also applies for the case in which the two dimensions are equal or in which the diameter is somewhat shorter than the axial length of the side wall. Particularly also making a contribution here is a relatively large bottom wall, on which the overpressure acts.

The pressure-equalization chamber positioned in the shaft and/or a drive part associated therewith can be dimensioned at least twice as large in the axial direction as the axial length of the nondeformed membrane, and the attachment of the mounting edge of the membrane can be provided at about half the height of the pressure-equalization chamber. This permits inversion of the membrane from a nondeformed position in the opposite direction practically over the entire axial length. A correspondingly large volume is available for pressure equalization. The drive part associated with the shaft can be one piece with the shaft or can be connected via a pressing or screwing process or the like so that the pressure-equalization chamber could also extend over such a point of connection in the interior of the shaft and the drive part.

Starting from the pressure-equalization chamber, a borehole or channel can run through the shaft, especially positioned coaxially in the center of the shaft. As a result, the connection of the pressure-equalization chamber with the external atmosphere can be accomplished in particularly simple fashion in that the shaft itself contains the corresponding connecting channel and leads through the housing wall to the outside. The coaxial arrangement in the shaft is particularly simple to produce and leads to a rotationally symmetric shaft. It would also be conceivable, however, if the space at the end of the shaft is needed for something else, e.g., the attachment of mounting elements or the like, to lead the corresponding ventilation channel somewhat obliquely through the shaft toward the outside and to let it exit not at the shaft end wall, but at a peripheral point on the shaft.

In order to protect the membrane within the pressure-equalization chamber as much as possible from mechanical damage, the pressure-equalization chamber can exhibit on the side opposite the borehole or channel a particularly removable or openable cover plate with a pressure-equalization opening, the plate shielding the pressure-equalization chamber toward the interior of the gear drive. If the pressure increases in the interior of the gear drive, this can spread through the mentioned pressure-equalization opening into the pressure-equalization chamber and lead to appropriate deformation of the membrane and vice versa. Here, air and/or lubricant from the gear drive can enter through the pressure-equalization opening into the pressure-equalization chamber and load the membrane and, upon reverse movement, be forced back into the gear drive.

The membrane can exhibit at the mounting edge a radially outwardly protruding flange for clamping and attachment within the pressure-equalization chamber. This represents an especially effective attachment which, at the same time, leads via clamping of the flange to a good seal.

The cover plate can exhibit protrusions locking into the wall of the pressure-equalization chamber or—especially preferred—a circular peripheral section as a hold-down device for securing the mounting edge of the membrane. As a result, the cover plate obtains a double function in that is shields the membrane from the gear-drive interior and simultaneously secures it in the pressure-equalization chamber.

The pressure-equalization chamber can have a larger cross-section in the area of the cover plate and the hold-down section than in the area into which the membrane can be turned inside out by an increased pressure in the interior of the gear drive, and an offset for accepting the mounting edge or flange of the membrane can be provided between these two areas of the pressure-equalization chamber, the hold-down section of the cover plate being supported in the installed position on the offset. The larger cross-section of the pressure-equalization chamber thus accepts the flange of the membrane serving as mounting edge as well as the hold-down section of the cover plate so that in the finally assembled form, the size of the pressure-equalization chamber within the hold-down section of the cover plate is approximately comparable to that of the chamber over the rest of the range if the radial thickness of the hold-down section corresponds to the radial dimension of the offset.

The circular side wall of the nondeformed membrane can form a truncated cone and attenuate toward the bottom wall at an acute angle. As a result, the tendency of the membrane to turn inside out can be improved already at low pressure differentials.

Especially upon combination of one or more of the above-described features and measures, one obtains a gear drive with pressure equalization between the interior and the external atmosphere without requiring corresponding openings and pressure-equalization chambers in the housing wall of the drive. One or more of the shafts belonging to the gear drive and passing through the housing wall can be used to bring about this pressure equalization, and also connect the pressure-equalization chamber with the external atmosphere via a corresponding borehole running through the shaft or a corresponding channel. Here, no additional space is needed for such pressure equalization if the shaft is designed for transmitting a relative high torque or also for high bending forces and is of an appropriately large size and can transmit these forces provided that the shaft is hollow over part of the length, namely in the area of the pressure-equalization chamber.

BRIEF DESCRIPTION OF THE DRAWINGS

An embodiment of the present invention is described in more detail below on the basis of the drawings. In the drawings.

DETAILED DESCRIPTION OF THE PREFERRED EMBODIMENT

Figure 1:
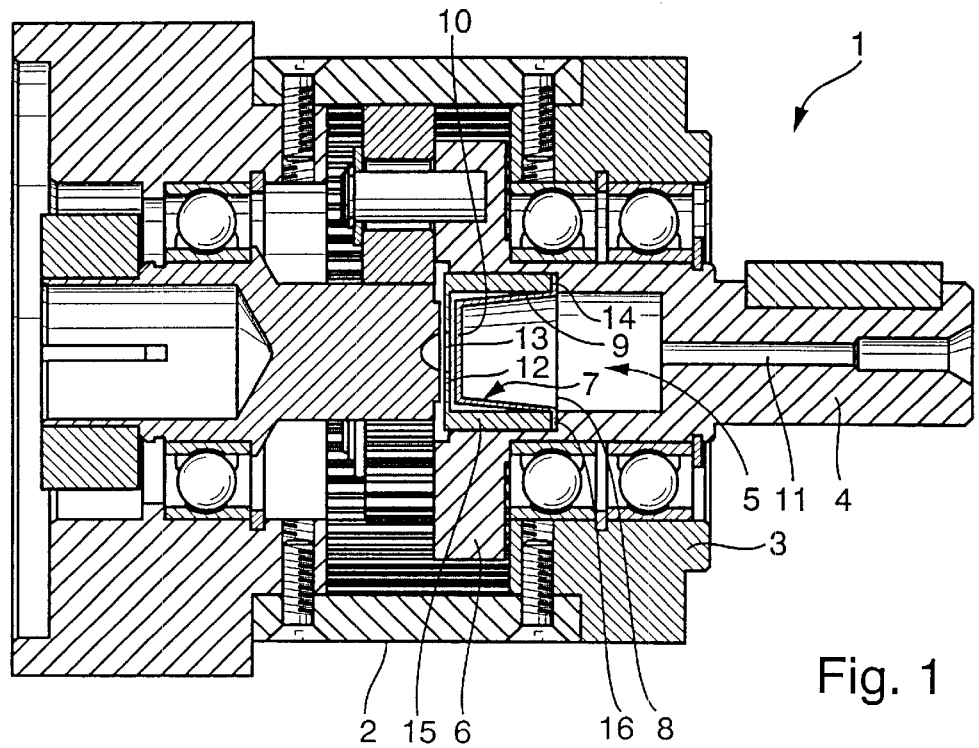
FIG. 1 is a longitudinal cross-section of a gear drive according to the present invention, in this case, a planetary gear drive, in whose output shaft is positioned a pressure-equalization chamber which extends into a drive part, in this case, the planetary gear carrier, and contains an invertible membrane, the membrane assuming the position at which no overpressure is present in the interior of the gear drive.

A planetary gear drive designated as a whole with 1 in the following, also referred to as "gear drive 1", includes a housing 2 formed of several parts as well as drive parts accommodated therein is shown. In particular, one recognizes a shaft 4 passing through a housing end wall 3, for example, the output shaft of the drive 1.

In order to be able to produce equalization of pressure between the external atmosphere and the interior of the gear drive 1 or the drive housing 2, which can become necessary, for example, upon heating up of the drive, a pressure-equalization chamber 5 is positioned in the interior of the shaft 4 and partially in a drive part 6 joined with the shaft 4, the chamber being connected, on the one hand, with the interior of drive 1 and, on the other hand, with the external atmosphere. A membrane 7 deformable by pressure differentials in a manner still to be described is positioned and secured in the pressure-equalization chamber 5.

Figure 2:
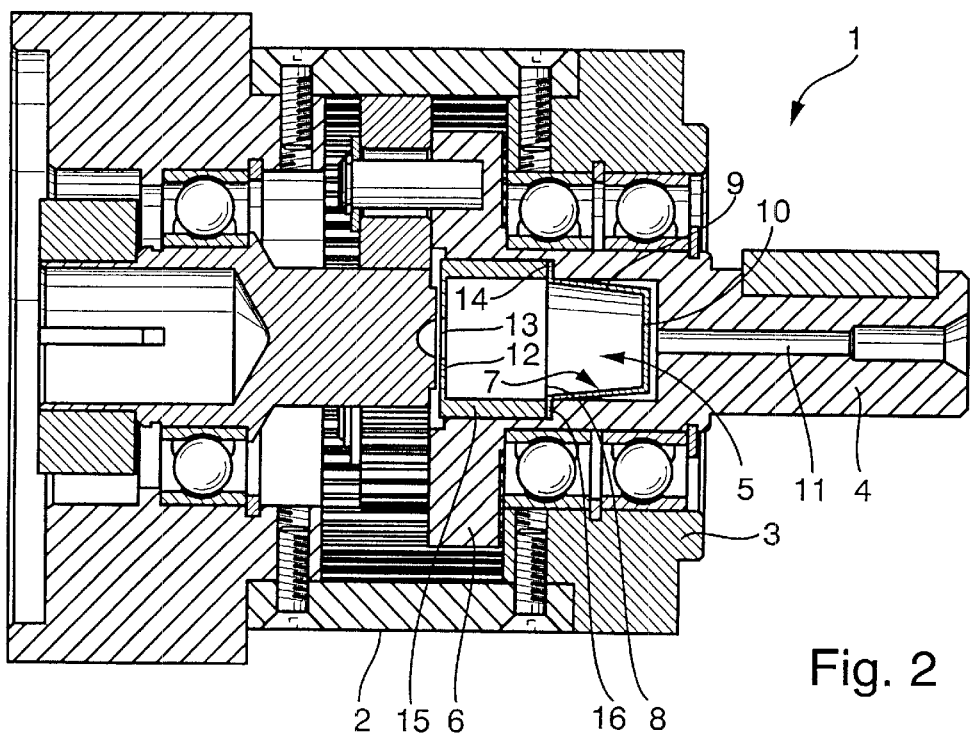
FIG. 2 is a cross-sectional view corresponding to FIG. 1, the membrane being turned inside out in the axial direction of the shaft containing it due to elevated pressure in the interior of the cylinder.

As shown in FIGS. 1 and 2, the pressure-equalization chamber 5 is positioned in an area of the shaft 4 which is located in the interior of drive housing 2, but the pressure-equalization chamber 5 could also be positioned entirely or partially in an area of the shaft 4 located outside the drive housing 2 should space conditions require this.

Figure 3:
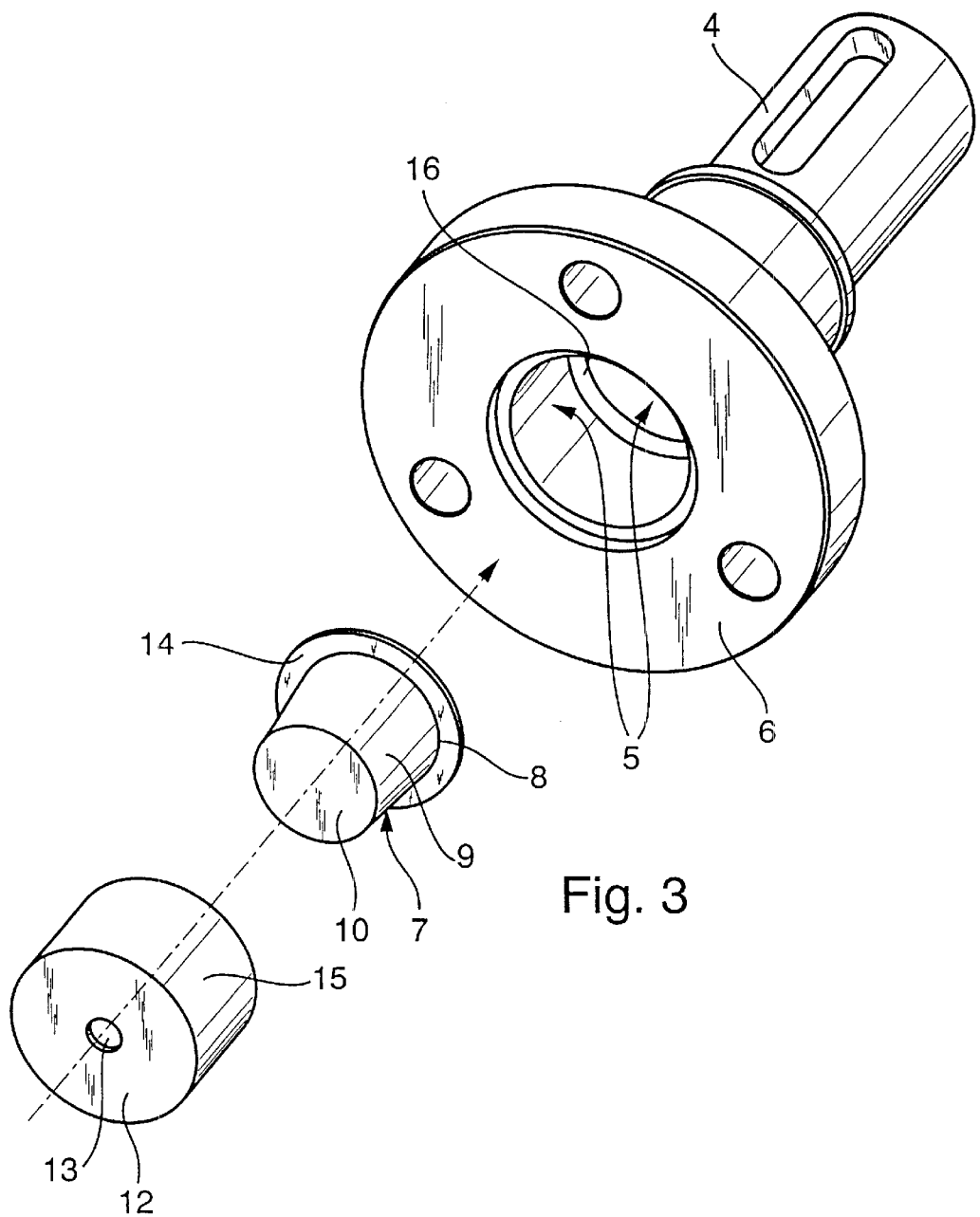
FIG. 3 is an exploded view of the output shaft with the associated drive part looking toward the opening in the pressure-equalization chamber and with the insertible membrane and a cover plate for securing the membrane in the pressure-equalization chamber and for the shielding toward the interior of the gear drive.

The membrane 7 positioned in the pressure-equalization chamber 5 in the interior of the shaft 4 and the drive part 6 associated therewith as one piece in the embodiment is essentially pot- or cap-shaped, as can be clearly seen in FIGS. 1–3, and exhibits starting from the circular mounting edge 8 a circular side wall 9, the side wall 9 transitioning into a bottom wall 10 on the end opposite the mounting edge 8. Upon comparison of FIGS. 1 and 2, it can be recognized that the membrane 7 with the bottom wall 10 is movable and invertible with respect to the mounting edge 8 depending on whether normal pressure prevails in the interior of the drive (FIG. 1) or the pressure is increased as a consequence of the power transmitted in the drive and the resulting heat or the like (FIG. 2). Here, the pressure-equalization chamber 5 and the membrane 7 as well as the side wall 9 have an essentially circular cross-section and are positioned concentrically in the interior of the shaft 4 in the embodiment so that a rotationally symmetric arrangement results.

The bottom wall 10 of the membrane 7 runs approximately parallel to the plane of the installed mounting edge 8 and is flat in the present embodiment, but could also be curved. The flat shape of the bottom wall 10 permits the best possible utilization of the axial range of the pressure-equalization chamber 5. The circular side wall 9 has in the present embodiment an approximately constant size over the entire axial range and the entire periphery, which also leads to correspondingly uniform deformation upon inversion of the membrane 7.

The inner diameter of the cap-shaped membrane 7 in the area of the mounting edge 8 may be about the same or possibly smaller, but in the present embodiment, is somewhat larger than the axial range of the nondeformed membrane 7, which facilitates the inversion compared to a membrane which is considerably longer in the axial direction.

The pressure-equalization chamber 5 positioned in the shaft 4 and the associated drive part 6 is dimensioned according to FIGS. 1 and 2 about twice as long in the axial direction as the axial range of the nondeformed membrane 7, and the attachment of the mounting edge 8 of membrane 7 is located about at the midpoint of the pressure-equalization chamber 5 so that membrane 7 can be inverted from the position shown in FIG. 1 to that shown in FIG. 2 and then back again in similar fashion in order to be able to best utilize the interior of pressure-equalization chamber 5 for pressure equalization while keeping the interior of gear drive 1 closed and sealed off from the external environment by the membrane 7.

In FIGS. 1 and 2, one further recognizes that starting from the pressure-equalization chamber 5, a borehole 11 or a channel runs through the shaft 4 toward the outside, specifically, in this case, coaxially in the center of the shaft 4. The channel or borehole 11 could, however, also run obliquely and not exit at the outer end wall of the shaft 4, but rather on the periphery of the shaft 4, in the case where a screw joint or other attachment of further parts is necessary on the end wall. In FIGS. 1 and 2, one recognizes on the end wall a countersunk opening of larger diameter than the borehole 11 serving as a channel, in which an attaching screw could be inserted, which then, on its part, would have a continuous axial borehole or opening in the interior in order to continue the borehole 11 toward the outside.

On the side opposite the borehole 11, the pressure-equalization chamber 5 has a removable or openable cover plate 12 (shown in FIG. 3 prior to assembly) with, in this case, a central pressure-equalization opening 13. Such a plate shields the pressure-equalization chamber 5 toward the interior of gear drive 1 and drive housing 2 without, however, effecting complete sealing. Via pressure-equalization opening 13, an increasing pressure in the gear drive 1 can also act within the pressure-equalization chamber 5 to deform and invert the membrane 7 from the position shown in FIG. 1 to that in FIG. 2. Nevertheless, the cover plate 12 can largely shield the membrane from the interior of the gear drive.

In the embodiment shown, the membrane 7 has on the mounting edge 8 a radially outwardly projecting flange 14 for clamping within the pressure-equalization chamber 5, i.e., for the attachment. For this purpose, the cover plate 12 in turn has a peripheral section extending along the wall of pressure-equalization chamber 5 and interlocking therein and serving as a hold-down device 15 for loading and securing mounting edge 8 by loading flange 14 and pressing and securing it against an offset 16 in pressure-equalization chamber 5, which simultaneously serves in sealing since the membrane 7 appropriately consists of a rubber elastic material.

The pressure-equalization chamber 5 has a larger cross-section in the area of the cover plate 12 and the hold-down device 15 than in the neighboring region into which the membrane 7 can be inverted by increased pressure in the interior of gear drive 1 according to FIG. 2, and between these two areas of different diameter of the pressure-equalization chamber 5 is the already mentioned offset 16 for receiving the mounting edge 8 or flange 14 of the membrane 7. Thus, the hold-down device 15 of the cover plate 12 can be supported on the offset 16; the flange 14, however, then coming to lie and to be secured between the hold-down device and offset 16.

The circular side wall 9 of the membrane 7 forms in the embodiment a truncated cone which attenuates toward the bottom wall 10 at an acute angle. This facilitates the deformation and inversion process.

Overall, one obtains a gear drive 1 with the possibility for equalization of pressure without requiring that the housing 2 or a housing wall 3 be provided with a corresponding pressure-equalization chamber, which frequently is not possible for space reasons. Rather, the shaft 4 passing through the housing wall 3 is utilized for receiving the pressure-equalization chamber 5 with the deformable membrane 7 and a borehole 11 leading to the outside. This is especially sensible and appropriate in gear drives 1 in which the output shaft 4 has an appropriately large diameter for transmission of larger power outputs and forces.

The gear drive 1, for example, a planetary gear drive, has a housing 2 and at least one shaft 4, for example, an output shaft leading through the housing wall 3 toward the outside. For equalization of pressure, a pressure-equalization chamber 5 is positioned in the interior of shaft 4 and/or a drive part 6 associated therewith and is connected, on the one hand, with the interior of gear drive 1 and, on the other hand, with the external atmosphere, for example, via a borehole 11 running through the shaft 4 so that the shaft 4, which has to pass through the housing 2 of the gear drive 1, is employed in equalization of pressure. Located in the pressure-equalization chamber 5 is a membrane 7 deformable via pressure differentials, the membrane separating and sealing the external atmosphere and the interior of the gear drive from each other.

What is claimed is:

1. Gear drive, comprising: a housing (2) and at least one rotatable shaft (4) passing through a housing wall (3) and at least one gear located in the housing and drivingly connected to the shaft, a pressure-equalization chamber (5) for equalization of pressure being provided between an interior of the housing and external atmosphere, the pressure-equalization chamber (5) is positioned in the at least one of the shaft (4) passing through the housing wall and/or in an associated drive part (6) and is connected with the interior of the drive (1) and with the external atmosphere, and a membrane (7) deformable by pressure differentials is positioned and secured in the pressure-equalization chamber (5).

2. Gear drive according to claim 1, wherein the membrane (7) positioned in the pressure-equalization chamber (5) located in the shaft (4) and/or the drive part (6) associated with the shaft (4) is essentially pot- or cap-shaped and includes a circular mounting edge (8), a circular side wall (9), and a bottom wall (10) connected to the side wall (9) on the end opposite the mounting edge (8), the side wall (9) turning into the bottom wall, and the membrane (7) with the bottom wall (10) is movable and invertible with respect to the mounting edge (8).

3. Gear drive according to claim 2, wherein the pressure-equalization chamber (5) and the membrane (7) as well as the side wall (9) have an essentially circular cross-section and are positioned concentrically in the interior of the shaft (4).

4. Gear drive according to one of claim 3, wherein the bottom wall (10) of the membrane (7) runs approximately parallel to a plane of the installed mounting edge (8) and is flat or curved, and the circular side wall (9) has an essentially constant size over an entire axial range and the entire periphery.

5. Gear drive according to claim 4, wherein the inner diameter of the cap-shaped membrane (7) in an area of the mounting edge (8) is one of about the same, smaller, or somewhat larger than an axial range of the nondeformed membrane (7).

6. Gear drive according to claim 2, wherein the pressure-equalization chamber (5) positioned in the shaft (4) and/or the associated drive part is dimensioned at least twice as long in the axial direction as an axial range of the nondeformed membrane (7), and the attachment of the mounting edge (8) of the membrane (7) is located about at the midpoint of the pressure-equalization chamber (5).

7. Gear drive according to claim 1 wherein starting from the pressure-equalization chamber (5), a borehole (11) or a channel extends through the shaft (4) toward the outside and is positioned coaxially in a center of the shaft (4).

8. Gear drive according to claim 7, wherein the pressure-equalization chamber (5) on a side opposite the borehole (11) or the channel includes a removable or openable cover plate (12) with a pressure-equalization opening (13), the plate shielding the pressure-equalization chamber (5) toward the interior of the gear drive (1).

9. Gear drive according to claim 8, wherein the membrane (7) includes a radially outwardly projecting flange (14) on the mounting edge (8) for clamping and attachment within the pressure-equalization chamber (5).

10. Gear drive according to claim 9, wherein the cover plate (12) includes interlocking projections or a peripheral section as a hold-down device (15) along the wall of pressure-equalization chamber (5) for securing the mounting edge (8) of the membrane.

11. Gear drive according to claim 10, wherein the pressure-equalization chamber (5) has a larger cross-section in an area of cover plate (12) and the hold-down device (15) than in a region into which the membrane (7) can be inverted by increased pressure in the interior of the gear drive (1), and between these two areas of the pressure-equalization chamber (5), an offset (16) is provided for receiving the mounting edge (8) or the flange (14) of the membrane (7), the hold-down device (15) of the cover plate (12) being supported thereon in the use position.

12. Gear drive according to claim 11, wherein the circular side wall (9) of the nondeformed membrane (7) forms a truncated cone and attenuates toward the bottom wall (10) at an acute angle.

\* \* \* \* \*